US008122211B2

(12) United States Patent
Stocklein et al.

(10) Patent No.: US 8,122,211 B2
(45) Date of Patent: Feb. 21, 2012

(54) USER INTERFACE INDICATOR FOR MOBILE DEVICE BACKUP STATUS

(75) Inventors: Carl J. Stocklein, Madison, WI (US); Konstantin Othmer, Mountain View, CA (US); Michael P. Ruf, Parkland, FL (US)

(73) Assignee: Core Mobility, Inc., Mountain View, CA (US)

( * ) Notice: Subject to any disclaimer, the term of this patent is extended or adjusted under 35 U.S.C. 154(b) by 948 days.

(21) Appl. No.: 11/741,558

(22) Filed: Apr. 27, 2007

(65) Prior Publication Data
US 2008/0270718 A1    Oct. 30, 2008

(51) Int. Cl.
*G06F 12/16*    (2006.01)

(52) U.S. Cl. ......... 711/162; 711/161; 714/6.1; 714/6.23

(58) Field of Classification Search .................. 711/161, 711/162; 714/6.1, 6.23
See application file for complete search history.

(56) References Cited

U.S. PATENT DOCUMENTS

| 7,559,025 B2 * | 7/2009 | Matsuzawa et al. | 715/700 |
| 2002/0131758 A1 * | 9/2002 | Austin | 386/46 |
| 2003/0191916 A1 * | 10/2003 | McBrearty et al. | 711/162 |
| 2005/0071589 A1 * | 3/2005 | Tross et al. | 711/162 |

* cited by examiner

*Primary Examiner* — Jae Yu
(74) *Attorney, Agent, or Firm* — Workman Nydegger

(57) ABSTRACT

Systems and methods are provided for performing data backup of a communication device. Data backup can occur automatically or manually. A data backup status indicator is displayed on the communication device indicating the current status of the data backup. The user can select the data backup status indicator to obtain additional information about the status of the data backup service.

18 Claims, 5 Drawing Sheets

USER INTERFACE INDICATOR FOR MOBILE DEVICE BACKUP STATUS

BACKGROUND OF THE INVENTION

1. Field of the Invention

The present invention relates generally to communications systems, methods and devices. More particularly, embodiments of the invention relate to systems and methods for performing data backup on a mobile communication device and indicating the status of the data backup using a status indicator.

2. Related Technology

The popularity of the Internet has given rise to a wide variety of information services and devices as consumers have become accustomed to accessing timely, personalized news and information. As a result, demand for these types of content and services as well as the communication devices through which the content and services are accessed continues to grow. In addition to the growth of the content and services that can be accessed using communication devices, cellular telephones and other communication devices are becoming increasingly sophisticated and offer a wide variety of different services. Voice dialing, picture messaging, voice memo, speakerphone, and text-to-speech capabilities are examples of some of the services that are found on current communication devices.

However, along with the demand for an increased number of features for mobile communication devices, product manufacturers have had difficulty informing consumers about the availability of these features and also educating consumers on the benefits of using the features. Usually, features are accessible via a "menu" interface. However, even if the user views a menu option for a certain feature, the user does not necessarily know what function the feature performs and how the feature can most efficiently be used. Often, features can be accessible only after accessing two or three layers of menu options, and most consumers do not take the time to peruse all of the menu options of their mobile communication devices. Activation of a feature may require additional steps such as contacting a manufacturer, purchasing additional hardware, downloading additional software, and the like, that make using a particular feature difficult.

For example, because of the increasing number of ways in which mobile communication devices can be used, the amount of information contained on mobile communication devices can be quite large. Often, some users store all of their organizational information, such as contacts, calendar, task list, personal notes, etc., on their mobile communication devices so that this information can be conveniently accessed anywhere. Unfortunately, many of these users do not perform data backup or may not realize that their mobile communication devices have the ability to perform this function. Thus, the data backup functionality of their devices may remain unused, leaving the valuable information susceptible to being lost due to system crashes, theft of the mobile communication device, and the like.

Furthermore, the difficulty of locating and operating data backup features of mobile communication devices often prevents users from backing up or otherwise synchronizing their data. For example, many mobile communication devices require the user to place the communication device in a cradle and then push a "backup" or "sync" button to initiate backup of data between the mobile communication device and another storage device (such as a user's computer or laptop). Alternatively, the data backup service may be located underneath various layers of menu options, requiring the user to go through two or more steps to initiate data backup. In some cases, users must contact a vendor or manufacturer to subscribe to a data backup service and then download additional software. Even after the software is installed, the user is not notified of the status of a backup. Thus, ascertaining the status of data backup may require multiple steps, often proving more of an inconvenience to a user, and compelling the user to choose to leave data unprotected.

BRIEF SUMMARY

These and other limitations are overcome by embodiments of the invention, which relate to systems and methods for performing data backup and status notification of data backup, both the operation and the notification occurring in a simple and efficient manner.

Embodiments of the invention include a data backup service located on the communication device. The data backup service communicates with a remote storage device to back up the data from the communication device to the remote storage device. The data backup occurs when data on the device or service changes. In addition, the data backup can occur automatically when the communication device is detected to be online. The data backup can occur over a wireless connection, which eliminates the need for unnecessary hardware, such as cradles or USB cords. Users can then access their data remotely from a remote server using any suitable browser application, including a browser application on the communication device.

A data backup status indicator is displayed on a display of the communication device that can be, in one embodiment, an interactive ticker or a graphical image. The data backup status indicator can display the status of data backup in varying stages. The data backup status indicator can also display the data backup status using varying colors. Other status indicators can be used, such as a graphical image of a lock in an unlocked and locked position or in different colors, indicating the security level of the data held on the communication device. Advantageously, the data backup status indicator prevents a user from having to search through various layers of menu options to ascertain whether the communication device's data is secure. This minimizes the effort for a user in securing important information or being aware of the possibility that the user's data is not backed up.

A user can select a data backup status indicator using the communication device's navigational mechanisms. Upon selection, a number of different options may be presented to the user including initiating a data backup process, receiving a tutorial or instructions about the data backup service, receiving a brief description of the data backup service, viewing an advertisement about the data backup service, and the like.

These and other aspects of embodiments of the present invention will become more fully apparent from the following description and appended claims.

BRIEF DESCRIPTION OF THE DRAWINGS

In order that the manner in which the above-recited features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with performing and notifying a user of data backup processes of a communication device such as a mobile communication device. Notification is achieved, in one embodiment, by integrating notification with the native interaction of the device. For example, a service that backs up the contact list would have the notification indicators of the backup status integrated with the contact list application as well as the home screen of the device.

As used herein, the term "backup" refers to transmitting a copy of data to a remote location for storage, and also extends to any of a variety of data transfer or sharing operations between a mobile device and a remote device, including synchronization (in which versions of data in different locations are reconciled), and sharing with third parties. Thus, the term "backup" extends to any of the foregoing operations, unless specified otherwise.

Operating Environments and Associated Devices

Figure 1:
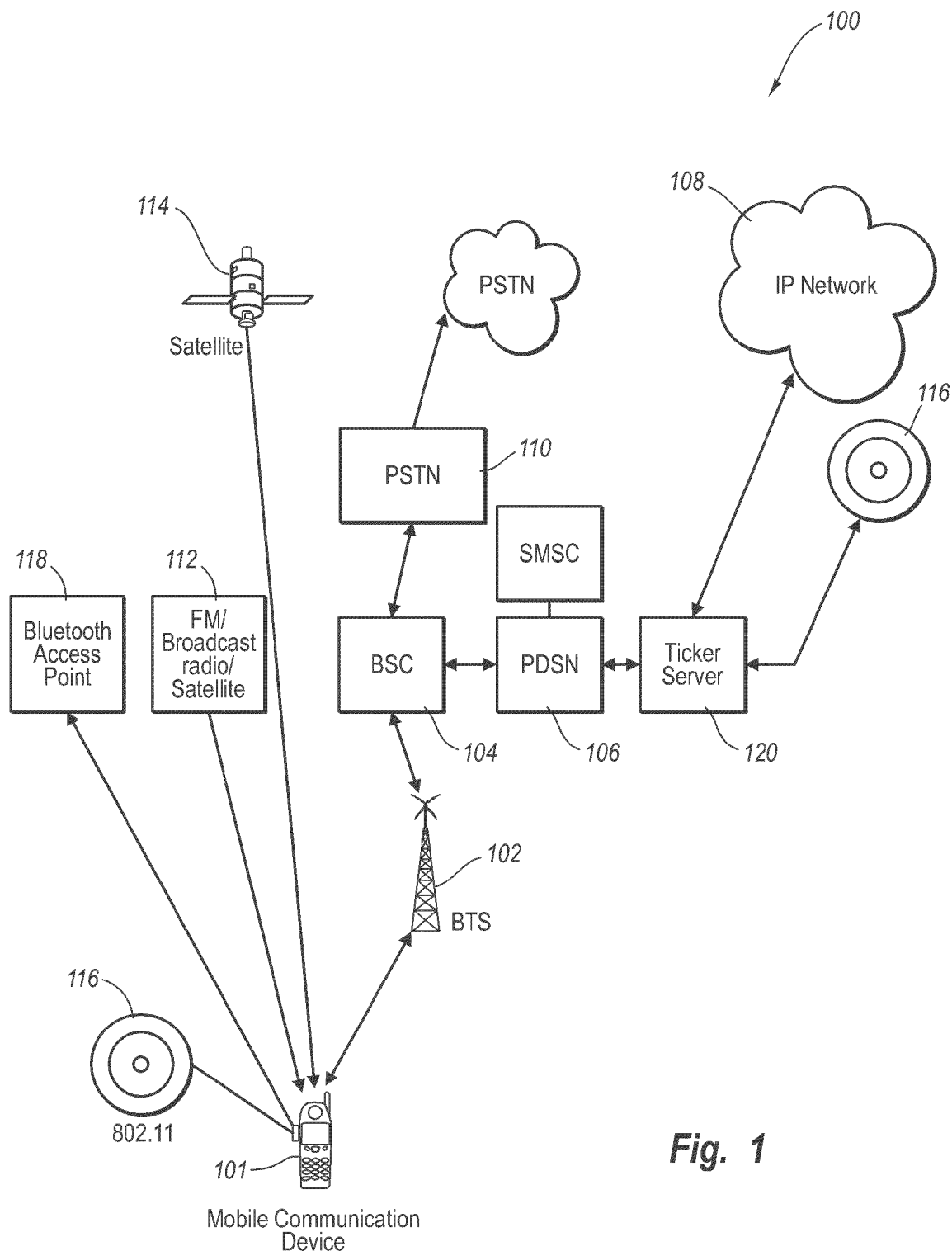
FIG. 1 is a schematic view illustrating aspects of an exemplary operating environment for embodiments of the invention.

With particular attention now to FIG. 1, one exemplary implementation of an operating environment, denoted generally at 100, is indicated. Although this exemplary operating environment comprises multiple types of networks, including a cellular telephone network, 802.11 networks, Bluetooth access points, and broadcast networks such as FM radio or satellite radio, the invention may be employed in connection with any other type of network and associated landline or wireless communication devices that are effective in implementing or facilitating communication.

While FIG. 1 depicts a cellular telephone and exemplary embodiments are directed to the use of cellular telephones in conjunction with the invention, the invention should not be construed to be limited to such devices. Many types of communication devices are available and are suitable for use in conjunction with the invention, including set top boxes, cellular telephones, PDAs, smart phones, and many other devices suitably equipped to establish communication with a network and having a display device such as a display screen may be used to implement the methods of the invention. Accordingly, the scope of the invention should not be construed to be limited to the exemplary operating environment indicated in FIG. 1.

In the exemplary illustrated embodiment, the operating environment 100 includes one or more mobile communication devices 101 (also referred to herein as "mobile device(s)" and/or "communication device(s)") configured to communicate with one or more networks and/or network elements, including base transceiver station (BTS) 102 of the cellular network, short messaging service (SMS) networks 106, internet protocol (IP) network 108, FM or satellite radio broadcast network 112, 802.11 wireless access points 116, and Bluetooth access point 118, or any other type of network, combination of networks, or network connections to which the communication device can connect and receive data transmissions. These data transmission modes are also referred to herein as "bearers". One or more of these network elements or bearers may be used to transmit content to the communication device 101. Mobile communication device 101 is optionally further configured with ticker client software that enables it, among other things, to communicate with ticker server 120 that may be embodied, in one implementation, as a server operating in conjunction with IP network 108. Ticker server 120 may further interface with other network elements, such as a Short Message Service Center (SMSC) and various gateways to implement the methods of the invention.

Data Backup and Notification

Figure 2:
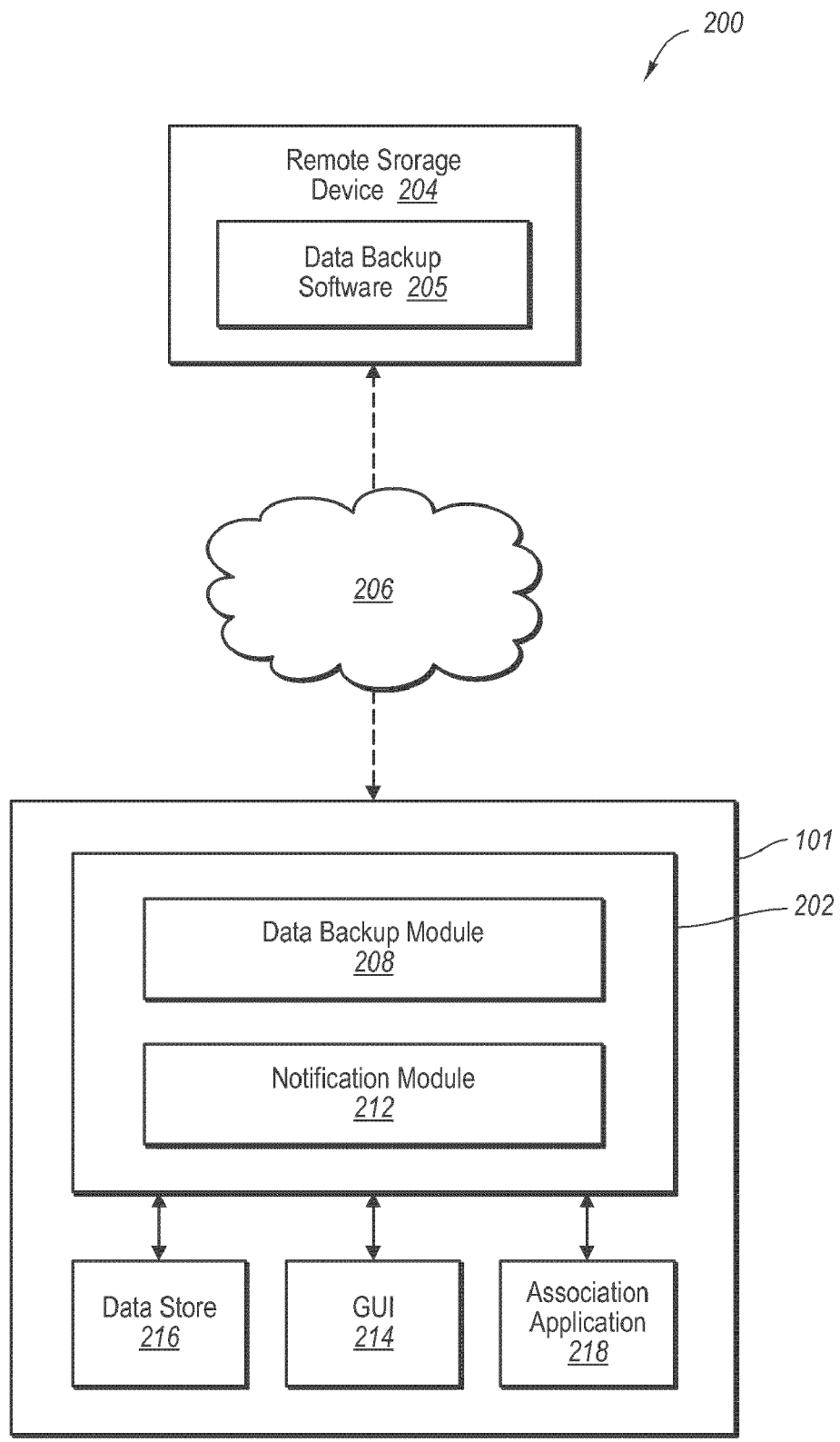
FIG. 2 illustrates exemplary aspects of data backup client software.

Turning to FIG. 2, details are provided concerning how the present invention performs data backup on a communication device and notifies the user of the status of the data backup. FIG. 2 and the accompanying discussion are presented to illustrate a suitable mobile communication device and associated data backup service with which the methods notifying of the status of data backup can be performed. The methods for notifying users of the status of data backup operations performed on communication devices can be employed in a variety of networks and with a variety of mobile communication devices, and the embodiments illustrated in FIG. 2 are presented for purposes of illustrating the invention.

FIG. 2 illustrates an example of a system 200 having a communication device 101 communicating with a remote storage device 204. Data backup client software 202 resides on communication device 101 while data backup software 205 resides on remote storage device 204. Remote storage device 204 can be, but is not limited to, data storage devices associated with servers, storage area networks (SANs), other computing devices, and the like. In addition to performing data backup processes, the data backup software 205 enables the user to view the data on the remote storage device 204 using a suitable browser application. The browser application used to access the data can reside on the communication device 101, itself.

The connection between the data backup client software 202 and remote storage device 204 can be formed via wired connection or a wireless connection. In some situations, the communication device 101 and remote storage device 204 can be in an "online" mode, in which the data backup client software 202 detects and/or connects to the network 206, or an "offline" mode in which the data backup client software 202 does not communicate with network 206. An "offline" and an "online" communication mode may also exist where the connection between the communication device 101 and remote storage device 204 is not a network, but rather, a non-network connection, such as a USB, IR, or other connection.

The data backup client software 202 includes a data backup module 208, a discovery module 210, and a notification module 212. The data backup client software 202 can further communicate with a graphical user interface 214, a data store 216 and one or more applications 218.

The data backup module 208 performs synchronization of data (e.g., in data store 216) stored on the communication device 101 with data that is stored on the remote storage device 204 and related to the communication device 101. The end result of data synchronization between the communication device 101 and the remote storage device 204 is to provide both devices with the most current set of data, whether that current data originally resided on the communication device 101 or the remote storage device 204. For example, the user may upload or otherwise provide updated or new contact information to remote storage device 204. The data backup service updates the data on the communication device 101 to reflect the changes made to the volume of data at the remote storage device 204 so that the user does not need to manually update the contact information on the communication device 101.

The data backup module 208 can be initiated automatically, for example, using an "automated backup" option set by the user. Alternatively, the data backup module 208 can be initiated manually by the user. In either case, when the data backup module 208 detects that the communication device 101 is online with the remote storage device 204, the data backup module commences to perform data backup and/or data synchronization between communication device 101 and remote storage device 204. In one embodiment, the data backup module 208 first determines whether a successful data backup has occurred in the past and whether a predetermined amount of time has passed since the previous successful data backup before proceeding with an automated data backup process. The data backup module 208 may log the progress of the data backup in data store 216.

Notification module 212 communicates with graphical user interface 214 to display a data backup status indicator on a display of the communication device 101. The notification module 212 determines the appropriate method of display and also the appropriate information to display. Selecting the method of display may include determining the display methods available on the communication device 101. Such methods may include displaying the data backup status indicator in the form of an interactive ticker, graphical image, and the like. Selecting the appropriate information to display includes communicating with the data backup module 208 to determine the current stage of the data backup. For example, the data backup status indicator can display varying stages of the data backup process, such as, but not limited to, "data backup initiated," "data backup in progress," "data backup complete," or "data backup incomplete" (including the reason for the incomplete data backup).

In one embodiment, the graphical user interface 214 displays the data backup status indicator via an interactive ticker. The ticker could also display the data backup status using different colors, such as "blue" for "data backup initiated," "orange" for "data backup in progress," "green" for "data backup complete," or "yellow" for "data backup incomplete" or "red" for "data not backed up." The graphical user interface may also use other means for displaying the data backup status, such as a graphical image of a lock in an unlocked and locked position or in different colors, or using different alphanumeric symbols, indicating the security level of the data held on the communication device. These methods for displaying the data backup status will now be described in further detail.

Figure 3:
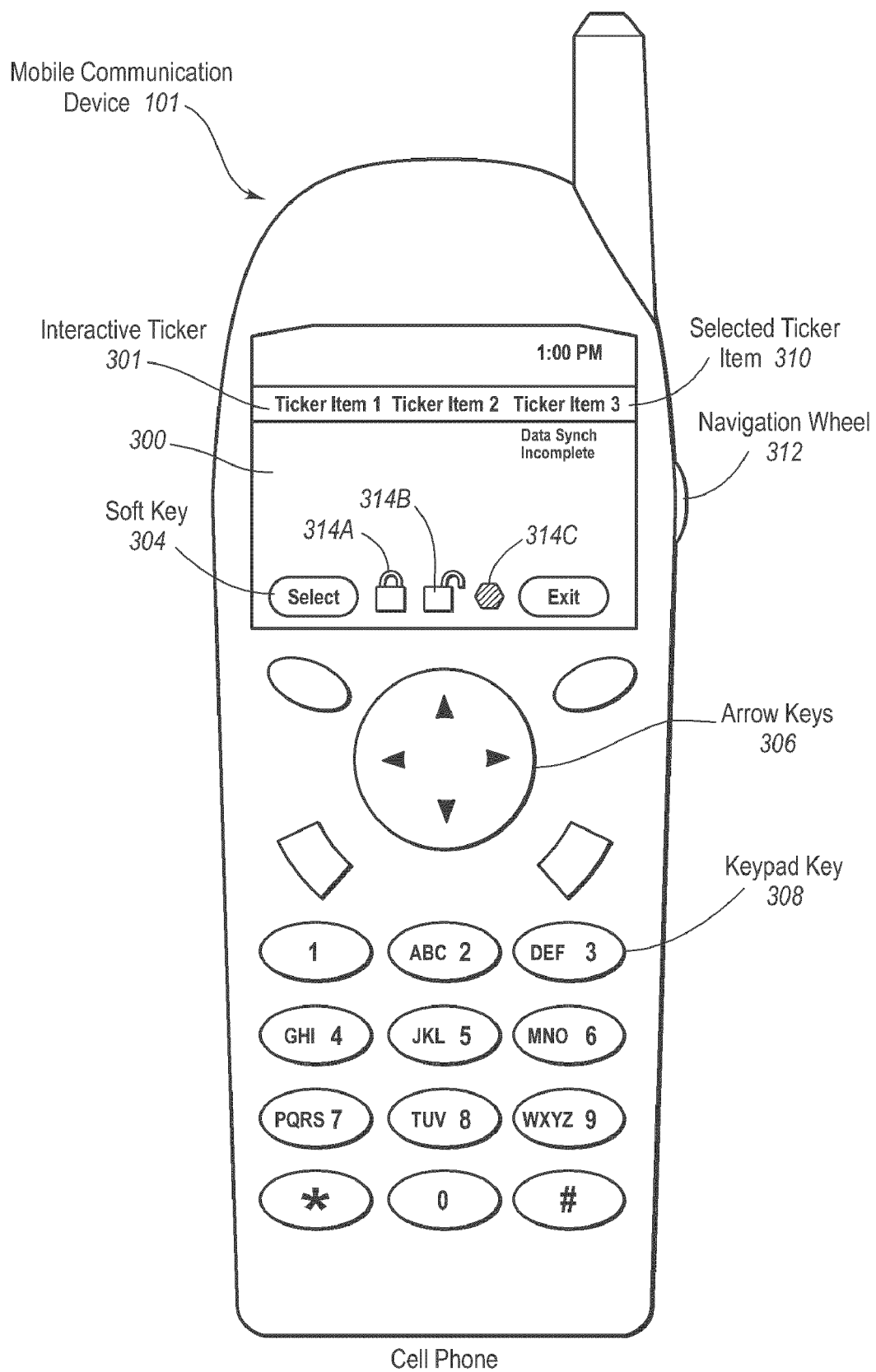
FIG. 3 is a schematic view illustrating examples of navigation mechanisms on a communication device.

Turning now to FIG. 3, a schematic diagram of a communication device 101 and example navigation mechanisms are shown. The communication device 101 includes a display 300 having various display methods. Using keys on a keypad of the communication device 101 or on a remote control device associated with the communication device, soft keys, other device buttons and wheels, voice commands, or by moving the communication device in a particular way, such as shaking it, turning it from side to side or upside down, or otherwise moving the communication device, the user interacts with the content on display 300. For convenience, these navigation mechanisms are hereinafter referred to collectively as "navigation mechanism(s)." Such navigation mechanisms include, but are not limited, to arrow keys 306, navigation wheel 312, soft keys 304 and alphanumeric keys 308 illustrated in FIG. 3.

One display method is an interactive ticker 301 located, in this example, at the top of the display 300 of the communication device 101. As used herein, the term "ticker" refers to a portion of a display screen on a communication device in which information is dynamically displayed. The content displayed within the interactive ticker may also be referred to herein as "ticker item(s)." In other words, the ticker items in the interactive ticker correspond to content, and some of the ticker items correspond to the data backup service of the communication device. In this manner, information about the data backup service of the communication device can be presented to the user in an interactive ticker 301 on the display of the communication device.

In FIG. 3, the ticker item #3 includes a data backup status indicator, with content indicating, for example, "Data Backup Incomplete." This is but one example of content that can be included in a data backup status indicator. Including the status of the data backup service as ticker item #3 is an unobtrusive way to alert the user that there is a potential problem with the security of the user's data. The decision to display a data backup status indicator in ticker 301 can also depend on which bearers are available to the communication device 101 at a given time. For example, if a network is not available, the notification module 212 may choose to not display a message, such as "Data Backup in Progress." Of course, the data backup status indicator can be displayed in the ticker at any time, without regard to the presence of a network, simply to notify the user of the existence of the data backup service.

In some cases, navigating to and selecting a ticker item causes an additional action to be performed, such as presenting supplemental information that expands on the subject of the ticker item, launching an application resident on the communication device, causing additional content, applications, or services to be downloaded to the communication device or accessed by the communication device, or causing any of a number of other actions to be performed. For example, if the selected ticker item corresponds to "data backup incomplete," additional content may appear describing the reasons that the data backup process did not complete (e.g., communication device offline). Additional details and examples of interactive tickers with which embodiments of the present invention can be used are provided in U.S. patent application Ser. No. 10/916,960, filed Aug. 11, 2004, which is incorporated herein by reference.

In another embodiment illustrated in FIG. 3, the notification module 212 renders the data backup status indicator in the form of a graphical image 314. Typically, only one data backup status indicator is displayed on the display 300 at any one time. However, for purposes of describing the present invention, multiple data backup status indicators are displayed to illustrate the various ways in which they can be displayed.

The graphical image 314 is any pictorial or alphanumeric symbol that suitably conveys information about the data backup service. In the example of FIG. 3, an image of a lock in an "unlocked mode" 314A is flashed on the display 300 to communicate the message, "unsecure" or "data not backed up." In another example, an image of an octagon 314B may be displayed in the color red (indicated by shading) to indicate that the data backup service is unused. As such, the data backup status indicator may implement a combination of graphical images and/or colors. The graphical images can be navigated and selected in the same manner as the ticker items described herein.

Figure 4:
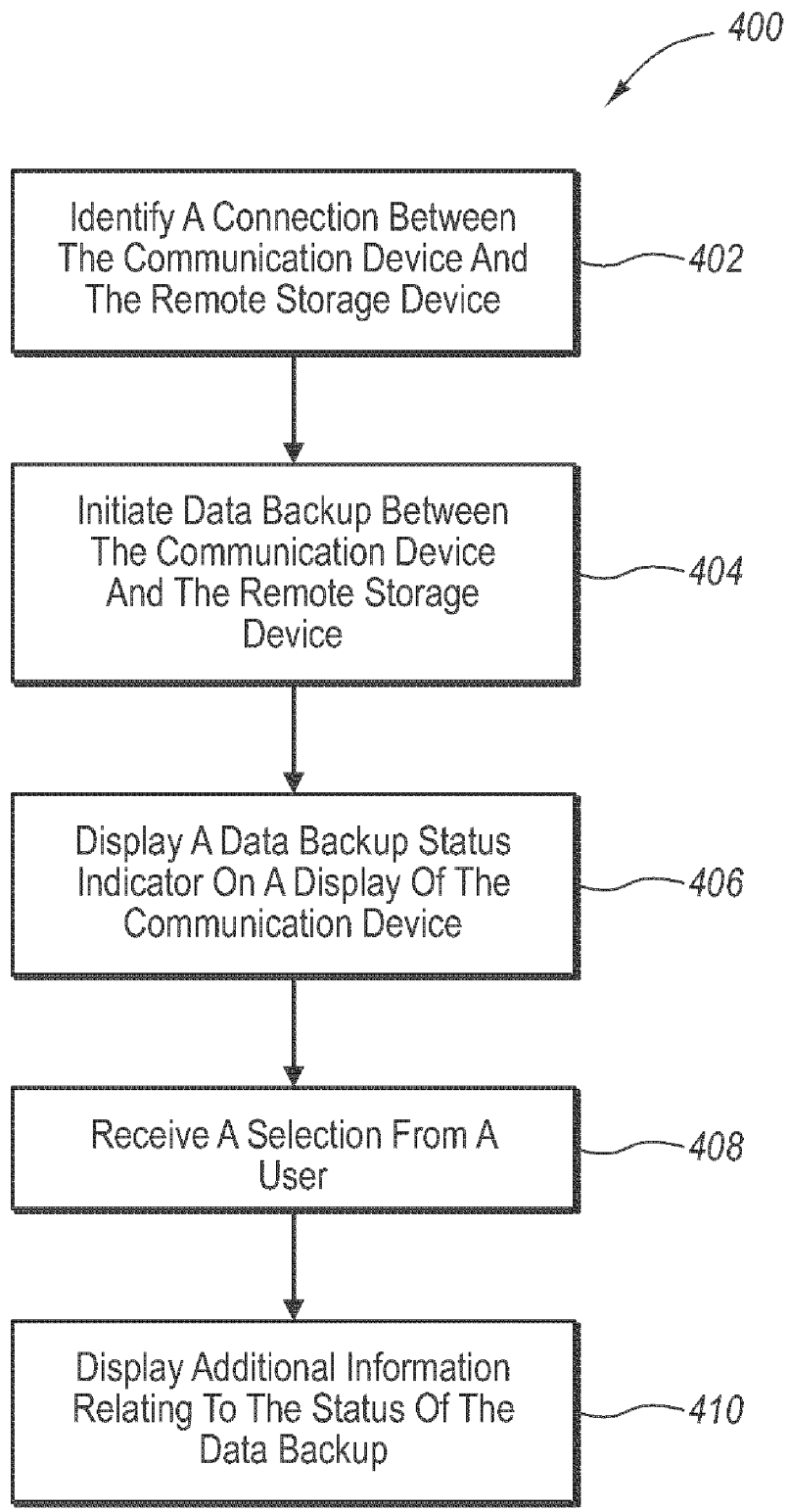
FIG. 4 is a flow chart illustrating an exemplary method for performing data backup and displaying a data backup status indicator.

FIG. 4 illustrates an example of a method for performing data backup of a communication device and a remote storage device and notifying a user of a status of the data backup. At 402, the data backup module 208 identifies a connection between a communication device 101 and a remote storage device 204. In one embodiment, the connection between the communication device 101 and the remote storage device 204 is a wireless connection. The connection can be via a network connection 206 or a non-network connection.

If the connection is available, at 404, the data backup module 208 initiates data backup of data located on the communication device 101 with data located on the remote storage device 204. In one embodiment, the data backup occurs automatically without requiring a user to manually initiate the data backup. In one embodiment, the data backup is performed after a predetermined period of time has passed since a previous successful data backup.

At 406, the notification module 212 automatically displays a data backup status indicator on a display 300 of the communication device 101. As mentioned above, the notification module 212 can display different stages of the data backup. For example, the different stages can be any one of the initiation of the data backup, the progress of the data backup, the completion of the data backup, the incompletion of the data backup, and the like. In one embodiment, the different stages of data backup can be displayed using different colors. The status of the data backup can be displayed on any suitable area of the graphical user interface 214, such as, but not limited to, an interactive ticker, using a graphical image, and the like.

At 408, the communication device 101 may receive a selection from a user to select the data backup status indicator. At 410, receipt of the selection may initiate additional information relating to the status of the data backup to appear on the display 300, such as a brief description of the status of the data backup or a tutorial related to the data backup service.

Figure 5:
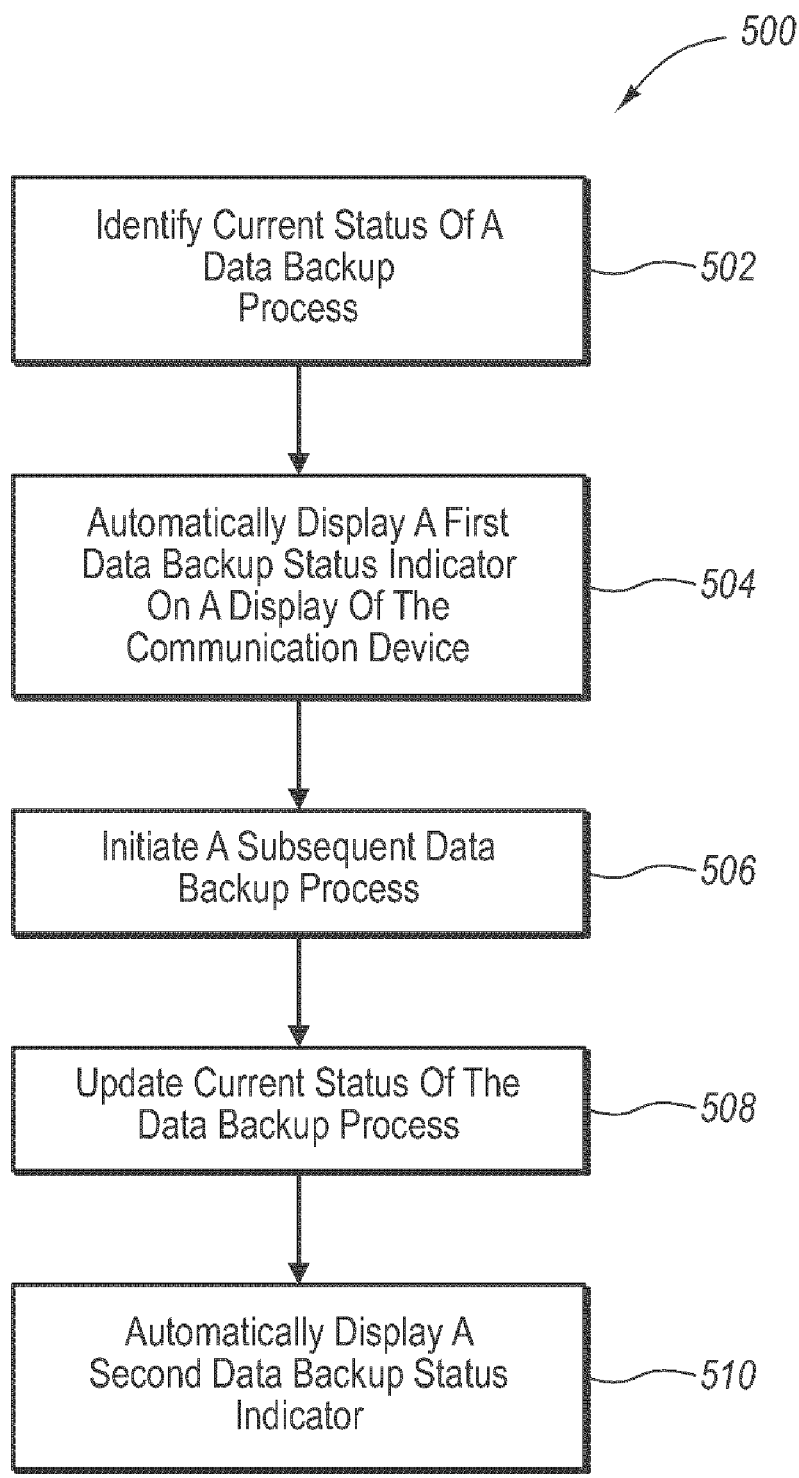
FIG. 5 is a flow chart illustrating an example method for notifying a user of a status of a data backup process.

The present invention also contemplates the situation where the display of the data backup status indicator is not necessarily tied to a current data backup process. That is, display of the data backup status indicator can occur at any time. An exemplary method of this embodiment is illustrated in FIG. 5 which illustrates a method for notifying a user of a status of a data backup process.

At 502, the notification module 212 identifies a current status of a data backup process on a mobile communication device. For example, the current status can be selected from at least one of data backup not initiated, data backup initiated, data backup in progress, data backup complete, data backup incomplete, and the like.

At 504, the notification module 212 initiates automatically displaying a first data backup status indicator on a display 300 of the mobile communication device 101, the first data backup status indicator identifying the current status of the data backup process. Note that the current status can consider situations where a data backup process is occurring or where a data backup process is not occurring.

At 506, subsequent to the display of the first data backup process, the data backup module 208 may initiate a first or subsequent data backup process. This can include identifying a connection between a mobile communication device and a remote storage device and performing data backup of data located on the mobile communication device with data located on the remote storage device. If the first data backup status indicator is displayed while a data backup process is occurring, the data backup module 208 may wait to perform the subsequent data backup process until after a predetermined period of time has passed since displaying the first data backup status indicator.

At 508, the notification module 212 updates the current status of the data backup process. At 510, the notification module 212 initiates automatically displaying a second data backup status indicator on the display of the mobile communication device, the second data backup status indicator identifying the updated current status of the data backup process. This can include either updating the content or color of the first data backup status indicator. Alternatively, this can include displaying an entirely new data backup status indicator. As discussed above, the first and second data backup status indicators can include any of the above display features.

Thus, the present invention provides efficient systems and methods for performing data backup, which can occur behind the scenes without the user being required to initiate the backup. Heretofore, users have generally been required to affirmatively perform some action to initiate data backup. Thus, users can be more assured of the security of data held on mobile devices by performing automatic data backup without the user's specific request to do so. Furthermore, enabling users to initiate data backup via a data backup status indicator (e.g., a ticker item or graphical image) that is readily viewable on the display of the mobile device greatly increases the ability of users to secure their data rather than having to navigate through various menu options to locate the data backup functionality.

The present invention also provides notification regarding the status of the data backup for communication devices via a data backup status indicator displayed on the display of the mobile device (e.g., a ticker item or graphical image). Heretofore, unless the user affirmatively requested a data backup, the user was not always aware of whether the data on the mobile device was secure. In one preferred embodiment, where the data backup occurs automatically without the user's notice, providing a data backup status indicator apprises the user of whether the data on the communication device is backed up (i.e., safe) or not. The data backup status indicator keeps the user readily apprised of the state of the data backup by indicating various stages in which the data backup process may be. This saves the user time in searching through various layers of menu options to ascertain whether the communication device's data is secure. Furthermore, where a data backup is for some reason incomplete, the data backup status indicator alerts the user and provides a simple mechanism for obtaining additional information about the state of the data backup (e.g., selecting the ticker item or the graphical item with a single click).

Telecommunication Devices and Computing Environments

Embodiments of the present invention may be implemented in connection with a special purpose or general purpose telecommunications device, including wireless telephones and other telephony-enabled wireless devices, landline telephones, or special purpose or general purpose computers that are adapted to have telecommunications or data networking capabilities such as cable set top boxes or PCs. Embodiments within the scope of the present invention also include computer-readable media for carrying or having computer-executable instructions or electronic content structures stored thereon, and these terms are defined to extend to any such media or instructions that are used with telecommunications devices.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired and wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

We claim:

1. In a mobile computing device, a method of displaying an indicator to notify a user of the mobile computing device of the backup status of data on the mobile computing device, the method comprising:
    determining, by a processor of the mobile computing device, that at least a portion of data stored on the mobile computing device has not been backed up;
    in response to the determination, selecting a first graphical indicator from among a plurality of graphical indicators stored on the mobile computing device, the first graphical indicator representing that at least a portion of the data stored on the mobile computing device has not been backed up;
    automatically displaying the first graphical indicator on a display device of the mobile computing device to indicate to the user of the mobile computing device that at least some of the data on the mobile computing device has not been backed up;
    subsequent to displaying the first graphical indicator on the display device of the mobile computing device, determining, by the processor, that the data stored on the mobile computing device has been backed up;
    in response to the determination, selecting a second graphical indicator from among the plurality of graphical indicators stored on the mobile computing device, the second graphical indicator representing that the data stored on the mobile computing device has been backed up; and
    automatically displaying the second graphical indicator on the display device of the mobile computing device in place of the first graphical indicator to indicate to the user that the data on the mobile computing device has been backed up.

2. The method of claim 1, further comprising:
    while the first indicator is being displayed, determining that a backup of the data stored on the mobile computing device is currently being performed;
    in response to the determination, selecting a third indicator from among the plurality of graphical indicators stored on the mobile computing device, the third graphical indicator representing that a backup of the data stored on the mobile computing device is currently being performed; and
    automatically displaying the third graphical indicator on the display device of the mobile computing device in place of the first graphical indicator to indicate to the user that a backup of the data is currently being performed.

3. The method of claim 1, further comprising:
    while the first graphical indicator is being displayed, receiving user input that selects the first graphical indicator; and
    in response, displaying an option to the user to initiate a backup of the data stored on the mobile computing device.

4. The method of claim 3, further comprising:
    receiving user input that selects the option; and
    initiating a backup of the data stored on the mobile computing device.

5. The method of claim 1, wherein the first indicator is a lock that is in an unlocked position, and the second indicator is a lock that is in a locked position.

6. The method of claim 1, wherein the first and second indicators have a similar shape but are different colors.

7. The method of claim 1, wherein the first and second indicators are displayed within a ticker on the display device.

8. One or more non-transitory computer readable media storing computer executable instructions which, when executed by a processor in a mobile computing device, perform a method of displaying an indicator to notify a user of the mobile computing device of the backup status of data on the mobile computing device, the method comprising:
    determining, by a processor of the mobile computing device, that at least a portion of data stored on the mobile computing device has not been backed up;
    in response to the determination, selecting a first graphical indicator from among a plurality of graphical indicators stored on the mobile computing device, the first graphical indicator representing that at least a portion of the data stored on the mobile computing device has not been backed up;
    automatically displaying the first graphical indicator on a display device of the mobile computing device to indicate to the user of the mobile computing device that at least some of the data on the mobile computing device has not been backed up;
    subsequent to displaying the first graphical indicator on the display device of the mobile computing device, determining, by the processor, that the data stored on the mobile computing device has been backed up;
    in response to the determination, selecting a second graphical indicator from among the plurality of graphical indicators stored on the mobile computing device, the second graphical indicator representing that the data stored on the mobile computing device has been backed up; and automatically displaying the second graphical indicator on the display device of the mobile computing device in place of the first graphical indicator to indicate to the user that the data on the mobile computing device has been backed up.

9. The one or more non-transitory computer readable media of claim 8, further comprising:

while the first indicator is being displayed, determining that a backup of the data stored on the mobile computing device is currently being performed;

in response to the determination, selecting a third indicator from among the plurality of graphical indicators stored on the mobile computing device, the third graphical indicator representing that a backup of the data stored on the mobile computing device is currently being performed; and automatically displaying the third graphical indicator on the display device of the mobile computing device in place of the first graphical indicator to indicate to the user that a backup of the data is currently being performed.

10. The one or more non-transitory computer readable media of claim 8, further comprising:

while the first graphical indicator is being displayed, receiving user input that selects the first graphical indicator; and in response, displaying an option to the user to initiate a backup of the data stored on the mobile computing device.

11. The one or more non-transitory computer readable media of claim 10, further comprising:

receiving user input that selects the option; and initiating a backup of the data stored on the mobile computing device.

12. The one or more non-transitory computer readable media of claim 8, wherein the first indicator is a lock that is in an unlocked position, and the second indicator is a lock that is in a locked position.

13. The one or more non-transitory computer readable media of claim 8, wherein the first and second indicators have a similar shape but are different colors.

14. The one or more non-transitory computer readable media of claim 8, wherein the first and second indicators are displayed within a ticker on the display device.

15. In a mobile computing device, a method of displaying an indicator to notify a user of the mobile computing device of the backup status of data on the mobile computing device, the method comprising:

determining, by a processor of the mobile computing device, that at least a portion of data stored on the mobile computing device has not been backed up;

in response to the determination, selecting a first graphical indicator from among a plurality of graphical indicators stored on the mobile computing device, the first graphical indicator representing that at least a portion of the data stored on the mobile computing device has not been backed up;

automatically displaying the first graphical indicator on a display device of the mobile computing device to indicate to the user of the mobile computing device that at least some of the data on the mobile computing device has not been backed up;

while the first graphical indicator is being displayed, receiving user input that selects the first graphical indicator;

in response to the user input, displaying to the user an option to initiate a backup of the data stored on the mobile computing device;

receiving further user input that selects the option;

in response to the further user input:

initiating a backup of the data stored on the mobile computing device;

selecting a second graphical indicator from among the plurality of graphical indicators stored on the mobile computing device, the second graphical indicator representing that a backup of the data is currently being performed; and displaying the second indicator on the display device in place of the first indicator to indicate to the user that the backup of the data is currently being performed;

determining, by the processor, that the backup of the data has been completed;

in response to the determination, selecting a third graphical indicator from among the plurality of graphical indicators stored on the mobile computing device, the third graphical indicator representing that the data stored on the mobile computing device has been backed up; and automatically displaying the third graphical indicator on the display device of the mobile computing device in place of the second graphical indicator to indicate to the user that the data on the mobile computing device has been backed up.

16. The method of claim 15 wherein the first, second, and third indicators are a similar shape, but are each a different color.

17. The method of claim 15 wherein the first, second, and third indicators are displayed within a ticker on the display device.

18. The method of claim 15 wherein the first indicator is a lock that is in an unlocked position, and the third indicator is a lock that is in a locked position.

* * * * *